United States Patent
Roy et al.

(10) Patent No.: US 12,468,764 B2
(45) Date of Patent: Nov. 11, 2025

(54) INTELLIGENT GRAPH ANALYSIS FOR NETWORK MANAGEMENT

(71) Applicant: Accenture Global Solutions Limited, Dublin (IE)

(72) Inventors: Debashish Roy, San Diego, CA (US); Brent Shaffer, San Diego, CA (US); Cory King, Carlsbad, CA (US)

(73) Assignee: Accenture Global Solutions Limited, Dublin (IE)

( * ) Notice: Subject to any disclaimer, the term of this patent is extended or adjusted under 35 U.S.C. 154(b) by 122 days.

(21) Appl. No.: 17/823,571

(22) Filed: Aug. 31, 2022

(65) Prior Publication Data

US 2024/0070198 A1 Feb. 29, 2024

(51) Int. Cl.
*G06F 16/901* (2019.01)
*G06Q 10/0631* (2023.01)
*G06Q 50/06* (2024.01)
*H04W 24/02* (2009.01)

(52) U.S. Cl.
CPC ... *G06F 16/9024* (2019.01); *G06Q 10/06316* (2013.01); *G06Q 50/06* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 5,982,934 | A * | 11/1999 | Villalba | G06F 18/24323 382/226 |
| 10,320,698 | B1 * | 6/2019 | Allen | H04L 41/122 |
| 11,522,885 | B1 * | 12/2022 | Maknickas | H04L 63/145 |
| 2009/0055270 | A1 * | 2/2009 | Magdon-Ismail | G06F 16/957 705/14.27 |
| 2017/0142465 | A1 * | 5/2017 | Ray | H04N 21/25883 |
| 2020/0020015 | A1 * | 1/2020 | Anders | G06Q 10/083 |
| 2020/0042019 | A1 * | 2/2020 | Marczuk | G08G 1/202 |
| 2021/0303536 | A1 * | 9/2021 | Alesiani | G06F 16/9024 |
| 2021/0318685 | A1 * | 10/2021 | Jenkins | G06Q 30/018 |

(Continued)

FOREIGN PATENT DOCUMENTS

| | | | | |
|---|---|---|---|---|
| CN | 111091309 | A | 5/2020 | |
| CN | 112464040 | A * | 3/2021 | G06F 16/9024 |
| CN | 112508364 | A | 3/2021 | |

OTHER PUBLICATIONS

Wang, Xuesong, Shikai You, and Ling Wang. "Classifying road network patterns using multinomial logit model." Journal of Transport Geography 58 (2017): 104-112 (Year: 2017).*

(Continued)

*Primary Examiner* — Darlene Garcia-Guerra
(74) *Attorney, Agent, or Firm* — Seed Intellectual Property Law Group LLP

(57) ABSTRACT

Systems and methods to facilitate the identification of connections or relationships in a network that are high impact in order to generate recommendations for future network growth are disclosed. The embodiments convert network maps into graphs comprising nodes and edges. The system identifies the edge that, when removed, causes the greatest impact on the network as a whole. In one embodiment, the system can be used to identify locations for installation of electric vehicle charging stations.

7 Claims, 12 Drawing Sheets

(56) References Cited

U.S. PATENT DOCUMENTS

| | | | |
|---|---|---|---|
| 2022/0026221 A1* | 1/2022 | Tian | G06N 3/08 |
| 2022/0156337 A1* | 5/2022 | Ssi-Yan-Kai | G06F 16/9538 |
| 2023/0102002 A1* | 3/2023 | Garapati | H04L 41/0636 |
| | | | 709/223 |
| 2023/0132638 A1* | 5/2023 | Sunderrajan | G01C 21/3815 |
| | | | 701/117 |
| 2023/0388224 A1* | 11/2023 | Sinop | H04L 45/02 |

OTHER PUBLICATIONS

Parastvand, Hossein, et al. "A graph automorphic approach for placement and sizing of charging stations in EV network considering traffic." IEEE Transactions on Smart Grid 11.5 (2020): 4190-4200 (Year: 2020).*

Li, Yanhua, et al. "Growing the charging station network for electric vehicles with trajectory data analytics." 2015 IEEE 31st international conference on data engineering. IEEE, 2015 (Year: 2015).*

CN 112464040 A1, Deng et al., "Graph Structure Identification Method, Electronic Equipment And Computer Readable Storage Medium", Mar. 9, 2021 (machine translation) (Year: 2021).*

Xu, Jianwen, et al. "Charge station placement in electric vehicle energy distribution network." 2017 IEEE International Conference on Communications (ICC). IEEE, 2017 (Year: 2017).*

Morro-Mello, Igoor, et al. "Spatial connection cost minimization of EV fast charging stations in electric distribution networks using local search and graph theory." Energy 235 (2021): 121380 (Year: 2021).*

Feng Chen et al., "Multistage and Dynamic Layout Optimization for Electric Vehicle Charging Stations Based on the Behavior Analysis of Travelers", published Nov. 15, 2021; https://www.mdpi.com/2032-6653/12/4/243/htm [retrieved Apr. 25, 2023].

U.S. Department of Energy, "Electric Vehicle Infrastructure Projection Tool (EVI-Pro) Lite", https://afdc.energy.gov/evi-pro-lite [retrieved Apr. 25, 2023].

U.S. Department of Transportation, "EV Planning Resources: Cost Analysis", https://www.transportation.gov/rural/ev/toolkit/planning-resources/cost-analysis [retrieved Apr. 25, 2023].

U.S. Department of Transportation, "EV Planning Resources: Equitable Planning", https://www.transportation.gov/rural/ev/toolkit/planning-resources/equitable-planning [retieved Apr. 25, 2023].

Seerin Ahmad, "Impact Assessment of Electric Car Charging on LV Grids", https://thesiscommons.org/wq52h/ [retrieved Apr. 25, 2023].

* cited by examiner

INTELLIGENT GRAPH ANALYSIS FOR NETWORK MANAGEMENT

TECHNICAL FIELD

The present disclosure generally relates to a system for facilitating the planning and development of systems that exist as networks, such as electric vehicle ("EV") infrastructure. More specifically, the present disclosure generally relates to a using intelligent analytics to identify specific edges in a graph that represent areas of high impact.

BACKGROUND

Determining where to locate new plug-in electrical vehicles ("PEVs") can be difficult. Ensuring that the new charging stations and other associated infrastructure are added in a manner that promotes PEV adoption by consumers in both urban and rural areas while accommodating existing infrastructure and electrical distribution networks (EDN) architecture is essential to a long-term shift to PEV use.

Current PEV charging infrastructure planning is primarily focused on socio-economic factors, trip data, and business center locations. This type of approach leads to the creation of concentrated PEV charging zone in cities while low income areas may remain remote from the charging stations, thereby failing to encourage equitable access and a broader development of PEV infrastructure. Such an approach also exacerbates the problems of traffic congestion in these areas. Current PEV charging infrastructure planning does not consider the unique arrangement of roads in an area, does not consider the context of the arrangement of roads, and inadvertently incorporates the planning bias of the humans doing the planning. Attempts at creating enumeration models to determine locations have been computationally slow.

There is a need in the art for a system and method that addresses the shortcomings discussed above.

SUMMARY

A system and method for identifying the highest impact or most influential relationships in a network is disclosed. The system and method solve the problems discussed above by providing an intelligent system that is designed to allow clients to determine locations for installation of new entities such as EV charging stations based on where the charging station would provide the greatest benefit to the population of the target region. In one example, the system is designed to simulate the effect of currently available charging stations in order to determine the location in which a new charging station should be added by converting the network to a graphical representation or layout comprising of nodes and edges and then determining which edges are associated with the greatest weight in the graph. In some embodiments, the system includes a recommendation engine for identifying locations in an incremental or time-series based pattern that incorporates the new charging stations that are being added before generating a recommendation for subsequent stations. Thus, the proposed systems and methods are equipped to handle the dynamic changes associated with roadways as well as other types of networks.

In one aspect, the disclosure provides a method of identifying high impact relationships in a network. The method includes a first step of creating a graph representing the network, the graph comprising a plurality of nodes interconnected by a plurality of edges, each edge corresponding to a relationship between two nodes. A second step includes categorizing at least a first edge and a second edge of the plurality of edges as high impact edges based on a role the respective edge plays in the graph (while categorizing other edges in the plurality of edges in lower impact classes), for example via a first machine learning model, and a third step includes calculating a base graph entropy for the graph. The method also includes a fourth step of removing the first edge from the graph to yield a first modified graph, and a fifth step of calculating a first entropy reduction factor based on the first modified graph. A sixth step includes removing the second edge from the graph to yield a second modified graph, and a seventh step includes calculating a second entropy reduction factor based on the second modified graph. This process can be iteratively repeated for the number of edges that were categorized as being higher impact edges by the system. In addition, an eighth step includes applying a machine learning model to determine an edge of the plurality of edges having the highest impact on the network, wherein the determination is based on at least differential network entropy calculated using the first entropy reduction factor and the second entropy reduction factor, and a ninth step includes presenting, via a user interface, a recommendation based on the edge determined to have the highest impact on the network.

In another aspect, the disclosure provides a non-transitory computer-readable medium storing software comprising instructions executable by one or more computers which, upon such execution, cause the one or more computers to: (1) create a graph representing a network, the graph comprising a plurality of nodes interconnected by a plurality of edges, each edge corresponding to a relationship between two nodes; (2) categorize at least a first edge and a second edge of the plurality of edges as high impact edges; (3) calculate a base graph entropy for the graph; (4) remove the first edge from the graph to yield a first modified graph; (5) calculate a first entropy reduction factor based on the first modified graph; (6) remove the second edge from the graph to yield a second modified graph; (7) calculate a second entropy reduction factor based on the second modified graph; (8) apply a machine learning model to determine an edge of the plurality of edges having the highest impact on the network, wherein the determination is based on at least differential network entropy calculated using the first entropy reduction factor and the second entropy reduction factor; and (9) present, via a user interface, a recommendation based on the edge determined to have the highest impact on the network.

In another aspect, the disclosure provides a system for identifying high impact relationships in a network, the system comprising one or more computers and one or more storage devices storing instructions that are operable, when executed by the one or more computers, to cause the one or more computers to: (1) create a graph representing a network, the graph comprising a plurality of nodes interconnected by a plurality of edges, each edge corresponding to a relationship between two nodes; (2) categorize at least a first edge and a second edge of the plurality of edges as high impact edges; (3) calculate a base graph entropy for the graph; (4) remove the first edge from the graph to yield a first modified graph; (5) calculate a first entropy reduction factor based on the first modified graph; (6) remove the second edge from the graph to yield a second modified graph; (7) calculate a second entropy reduction factor based on the second modified graph; (8) apply a machine learning model to determine an edge of the plurality of edges having the highest impact on the network, wherein the determination is based on at least differential network entropy calculated using the first entropy reduction factor and the second entropy reduction factor; and (9) present, via a user interface, a recommendation based on the edge determined to have the highest impact on the network.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
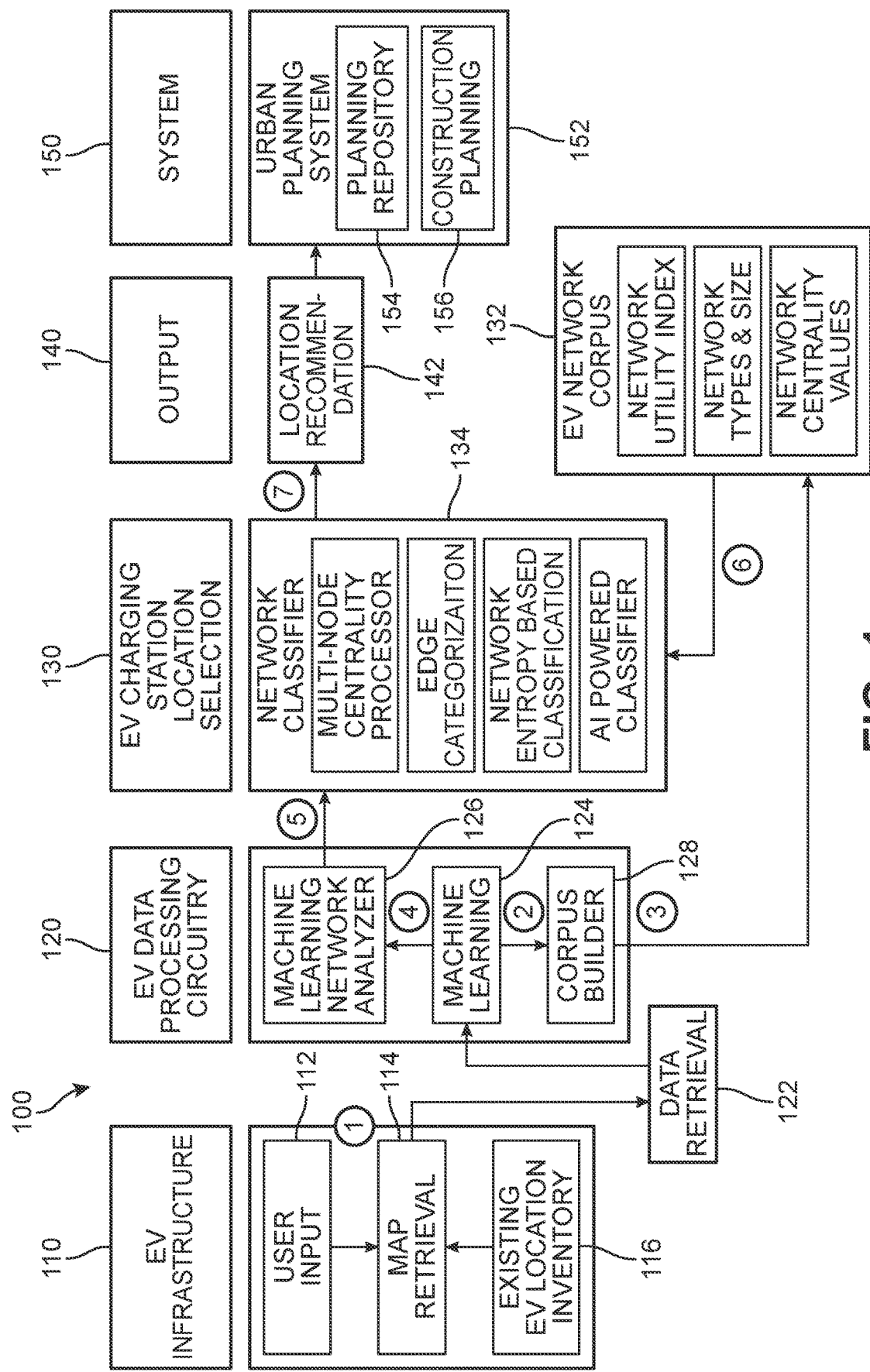
FIG. 1 is a schematic diagram of an environment for a network impact simulation system, according to an embodiment.

An adequate charging infrastructure is an important enabler or driver for the success of certain advanced vehicle technologies. An electrical charging station (ECS) distribution network, planned with foresight and optimally integrated into a region's existing energy network, has the potential to reduce range anxiety for battery electric vehicle (BEV) drivers and increase fuel savings of plug-in electric vehicles (PEVs). Thus, an adequate charging infrastructure is considered a technological prerequisite for reducing the market barriers to PEVs. However, limited public resources call for cost-effective and region-specific planning for the deployment of charging infrastructure.

As a general matter, adoption of alternative fuels and vehicles has been hindered by a "chicken or egg" problem, where consumers are reluctant to purchase EVs unless there is charging infrastructure, but energy suppliers are hesitant to build that infrastructure until enough alternative fuel vehicles are on the road to make it profitable. In the early stages of market development energy infrastructure tends to be underutilized and the development of sufficient demand can take decades. However, the assurance of having access to a charger along highways, in city centers, and at work is a top motivator for customers to make the switch to EV use.

Thus, unless the private benefits of EVs are compelling, public policy intervention is necessary to initiate markets for EVs and related infrastructure and sustain them during the early phases of development. This is especially true when there are important public benefits, such as reduced greenhouse gas emissions, improved local air quality, and energy security.

As will be described in greater detail below, the proposed embodiments offer an ECS distribution network simulator that can significantly improve charging infrastructure management and planning. In one embodiment, the ECS distribution network simulator implements a machine learning (ML) model that is configured to strategically simulate the installation of an ECS in a manner that incentivizes their use and expands access outside of concentrated city zones. For example, an ECS distribution network simulator ("simulator") can receive user input comprising electrical distribution network (EDN) configuration information including road network patterns and then perform a simulation. Analysis of the simulation output can then be interpreted to help determine the optimal site for installation of an ECS in a specific region. In some embodiments, the simulator will analyze the effects of deploying electric vehicle charging stations on promoting equitable access to the PEV market and increasing electric miles traveled in the context of the unique arrangement of roads in the area. In one example, the charging infrastructure planning model incorporates a multilevel approach based on network centrality assessment measures, link utility indices, and differential network entropy techniques to promote equitable EV charging infrastructure development.

In different embodiments, the proposed simulation system provides an intelligent EV charging location planning solution that can serve as an expert advisor when determining where a new charging station location should be installed. The system can provide assessments that linear, gridiron, radial, and irregular road networks. The system relies on a non-survey based approach to reduce dependency and provide on-demand analysis. Furthermore, the system can implement a multiple node centrality approach that substantially decreases the computational load required to generate the simulations, as well as increases the computational speed to do so.

It should be appreciated that while selection of a charging site represents a critical decision in the planning of an EV charging center that can benefit from the simulation systems described herein, the proposed systems and methods can also be readily applied to other types of social, biological, and artificial (man-made) systems that can be represented in the form of networks. For example, society itself can be understood to comprise a network of individuals that are connected along various social interactions and exchanges. In addition, communication and/or transportation critical infrastructure systems, such as the Internet or its subsystems, or a subway system or other public transit systems, can be modeled as networks that can benefit from the proposed techniques during their initial development or during subsequent expansion or modification stages.

In contrast to planning models where the primary input depends on the traffic estimation or the origin-destination (OD) trip-data, which require costly surveys, and rely on various estimation models to estimate future traffic volume (e.g., a calibration of gravity model, etc.) using current-year surveyed traffic data as an input that are prone to error, the proposed techniques are far more cost-friendly, effective in planning incremental as well as long-term urban infrastructure development, and encourage reductions in traffic congestion and unsafe driving conditions while increasing equitable access to charging infrastructure.

Referring now to FIG. 1, for purposes of introduction, an environment 100 in which an embodiment of the simulation system can be implemented for generation of prescriptive analytics for network high impact segments and recommendations is depicted. The environment 100 presents a flow sequence that extends across multiple stages, modules, and components, including EV infrastructure planning 110, EV data processing circuitry 120, EV charging station location selection 130, output 140, and system 150. A sequence of numerals represents an example of the process that can be performed via the environment 100. For example, at a first step, EV infrastructure planning 110 can occur in which user inputs 112 are received, triggering a map retrieval event 114 based on existing EV location inventories 116 and causing a data retrieval process 122 to be initiated via components of the EV data processing circuitry 120. In a responsive second step, a machine learning module 124 communicates with a corpus builder 128 and, during a third step, transmits a request to an EV network corpus 132. The EV network corpus 132 stores and/or manages information about network types and sizes, network utility indices, and network centrality values for the EV system.

In a fourth step, which may occur around the same time as the second step, the machine learning module 124 communicates with a machine learning network analyzer 126 and during a subsequent fifth step, transmits a request to a network classifier 134, which includes a multi-node centrality processor, an edge categorization module, a network entropy-based classifier, and an artificial intelligence (AI)-powered classifier. The network classifier 134 receives data from the EV network corpus 132 in a sixth step, which is used by the network classifier 134 to generate, in a seventh step, a location recommendation 142 as output. This output 140 is delivered to the system 150 for which some type of development or infrastructure planning is being targeted, such as an urban planning system 152, which can include a planning repository 154 where each output can be stored for access and review as well as a construction planning module 156, which can be configured to incorporate the output into the plans as concrete or itemized planning goals.

In different embodiments, the environment 100 described herein enables multi-level EV infrastructure planning using network analytics, link utility index data, and a differential entropy-based approach, with a significant reduction in computational processing for planning through differential entropy. The incorporation of road network categorization using machine learning, described in greater detail below, by use of multi-node centrality-based edge categorization machine learning models produce a simulation outcome promoting equitable charging infrastructure development.

Figure 2:
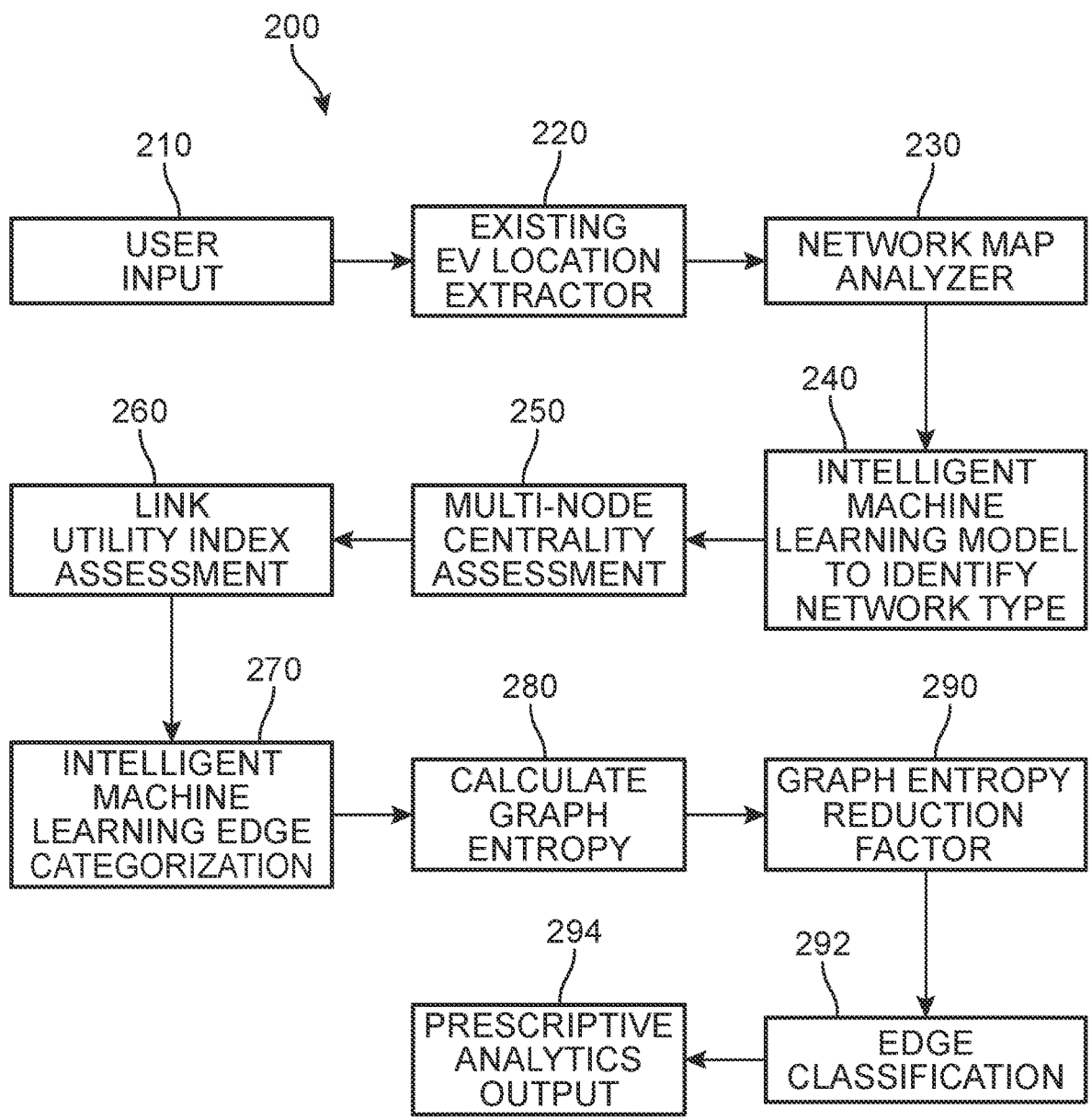
FIG. 2 is a schematic high-level flow diagram depicting a process for identification of a high impact relationship in the network, according to an embodiment.

Additional context regarding the sequence of steps described in FIG. 1 is now discussed with reference to a flow diagram depicting a process 200 for generating network categorization-based prescriptive analyses. As shown in FIG. 2, in a first step 210, user input will be received providing particular details that will localize the area or construct that is to be the target development system. In other words, the end-user can interact with the system through a user interface for the tool and submit an EV location assessment request for a particular area in a pre-existing map. For example, the user input may include a query or request for recommendations in planning in San Diego (or other area identifier such as a zip code or township, etc.). Based on this input, the system can extract all of the available information for the target location from a map as well as the available charging stations.

Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a user interface, or other such information presentation.

In a second step 220, an existing EV location extractor can identify the already-present charging stations in a target area or region. For example, the system can be configured to extract the existing EV location information from the selected map area, filtered based on the user's selected options, which will be used by the system when performing its analysis. Thus, each charging station in the target area can be identified and either excluded or included during the system's analysis based on the user's requirements.

In a third step 230, a network map analyzer will initiate an evaluation of the target region infrastructure, or more specifically, the road network pattern can be isolated and/or schematically represented. In other words, an intelligent machine learning module converts the map into a graph that includes a plurality of nodes interconnected by a plurality of edges that represent a network.

As a general matter, for purposes of this application, a mathematical definition of a graph is used, where the graph is a set (e.g., a collection of entities), usually represented by the capital letter G. The sets may be ordered and some of which may themselves be other sets (a set can have sets as its members). In the case of graphs, the entities inside the collection are nodes and edges. A graph is thus a set containing two sets as its members: a set of nodes (usually represented by the capital letter V) and a set of edges (usually represented by the capital letter E). In formal notation: G=V,E. The graph can also be referred to as a point-and-line diagram.

In different embodiments, the set of nodes can represent actors in a real world social network. For example, in social network analysis, actors are often either an individual or an organization, but in wider applications of the network imagery in the physical and biological sciences and network science, nodes can represent anything that links up to other similar entities in a larger system. These include power generation stations and homes, servers and computers, animals in an ecosystem, towns, really anything of substance that we can define some kind of relation on, or from which some type of content can be said to be exchanged.

Edges represent the presence of a connection or relationship between two nodes. In social network analysis, these connections are relationships between nodes, and edges in a graph are meant to represent them. In graph theory, edges are best thought of as a collection of pairs of nodes, where the two members of the pair are the nodes involved in the focal relationship. Thus, if node A is related to node B via some relationship R, then AB is an edge in the relevant graph. In the case of power generation stations and homes, the edges can represent power lines. Meanwhile, servers and computers are connected by internet cables and wi-fi access, while towns are connected by roads. The existence of edges can signal the potential for content to flow, whether that's power, computer data, or people in cars. In the case of social networks, the content that flows between two nodes are a relationship of some type. Additional names for nodes can include vertex or point. Relationships between two nodes, in addition to being called edges, can also be referred to as ties or links. Further details regarding an example of the process performed during third step 230 are now described with reference to FIGS. 3 and 4A-4C.

Figure 3:
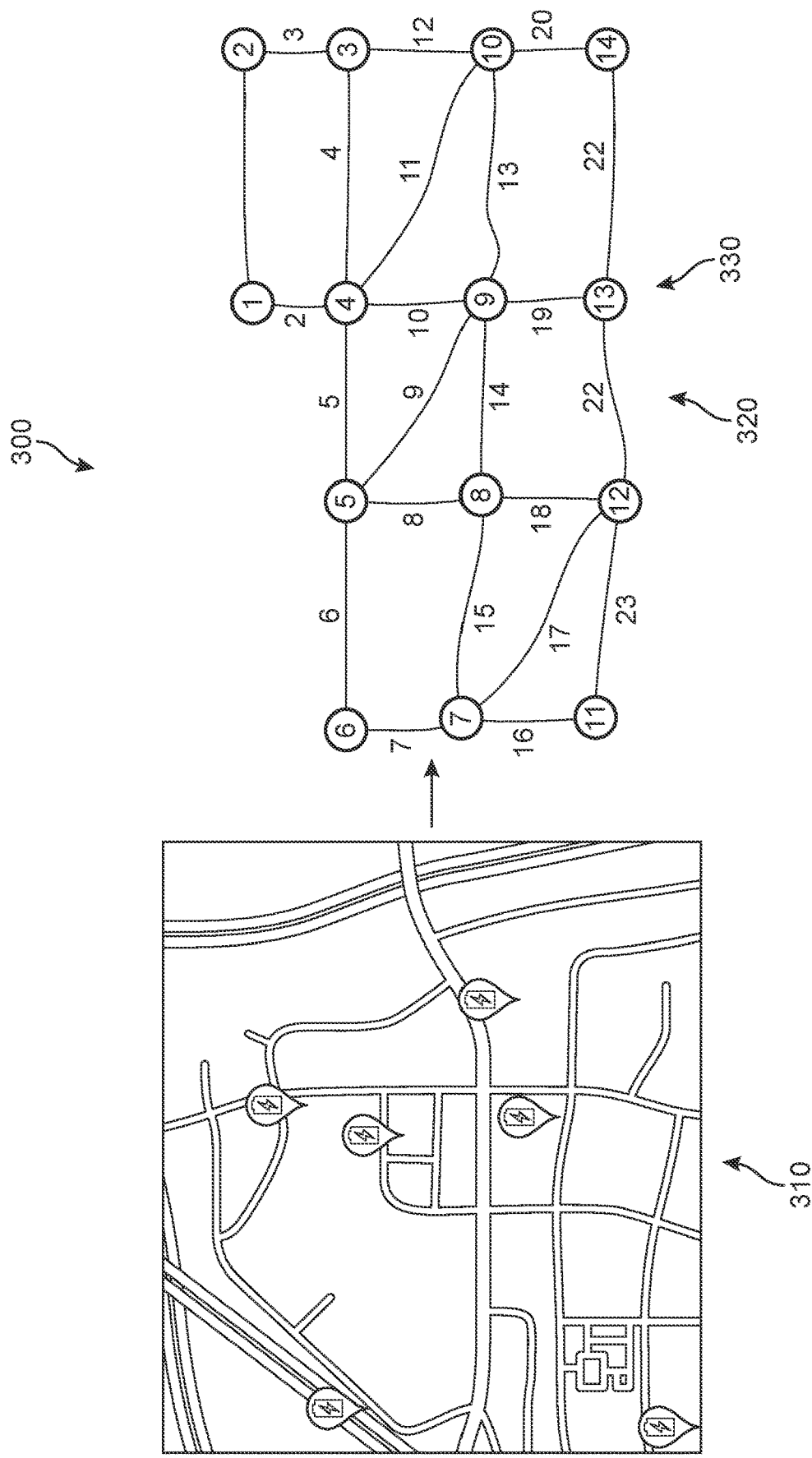
FIG. 3 is a schematic high-level flow diagram depicting a network map analysis process, according to an embodiment.
Figure 4A:
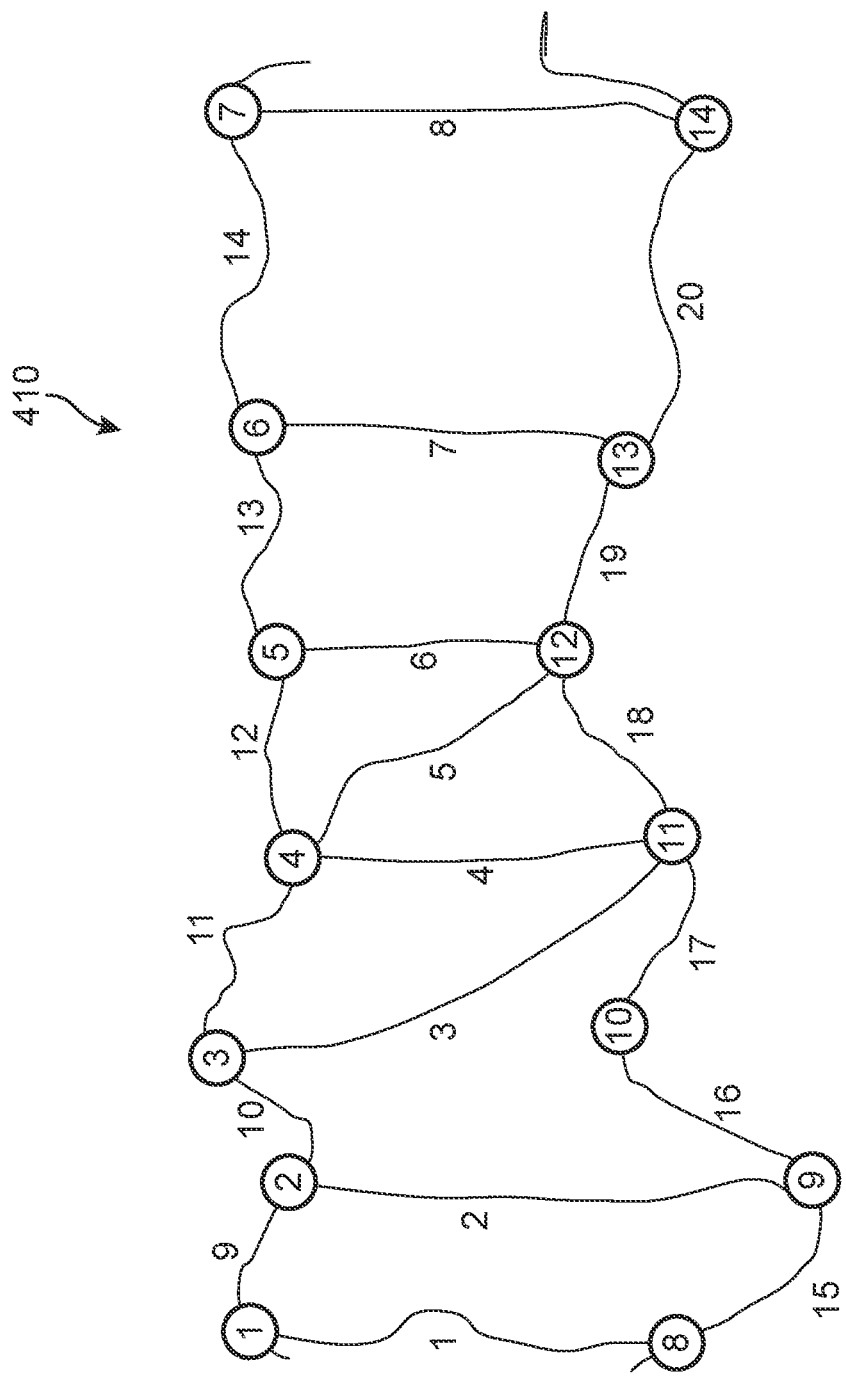
FIGS. 4A-4C are examples of three network types that may be used to classify the network, according to some embodiments.
Figure 4B:
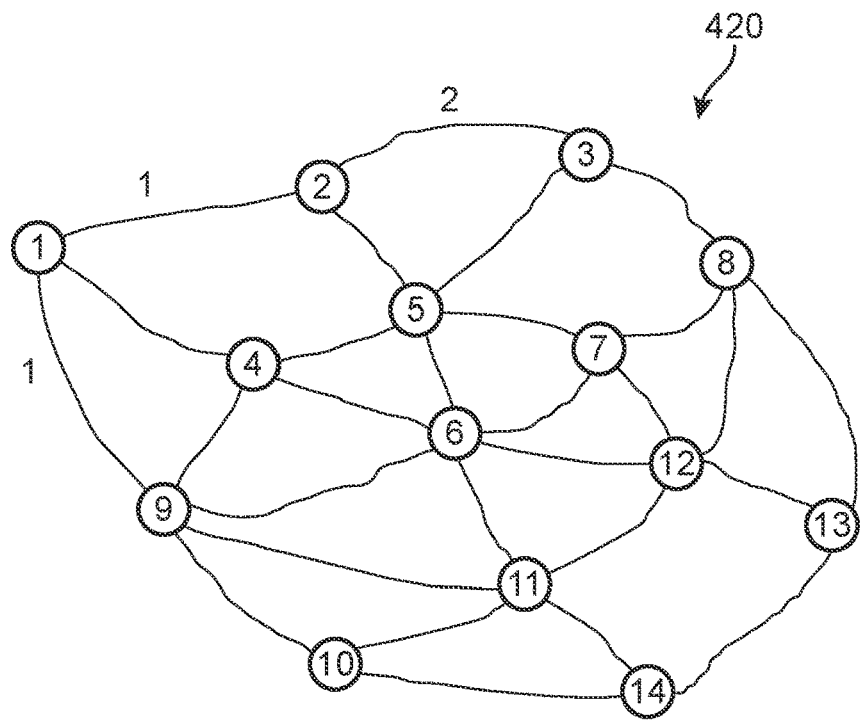
Figure 4C:
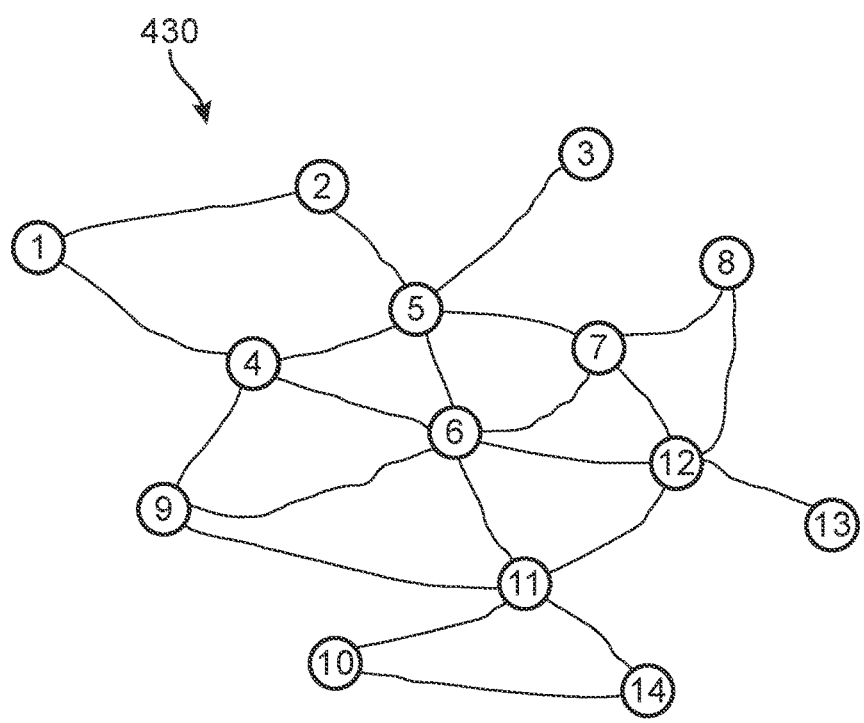

Referring to FIG. 3, an example map corresponding to a target area 310 is depicted, including a set of interconnecting roadways. For purposes of this example, the roads of target area 310 is generally arranged in a repeating grid. In FIG. 3, the network map analyzer 230 has assessed the layout of the roadways in target area 310, and outputs a graph or "first road pattern" 320. In this case, the first road pattern 320 corresponds to what will be herein classified as a gridiron road network 330. In some other cases, the target area may differ in road configuration and layout, and the outputted road pattern will change accordingly. For example, the network map analyzer may generate a road pattern similar to one shown in FIGS. 4A-4C, including a linear road network 410, a radial road network 420, and an irregular road network 430. In other embodiments, additional or alternate pattern classifications and labels may be assigned. As will be discussed with reference to a subsequent fourth step 232 in FIG. 2, the categorization of the outputted road pattern can greatly impact the decisions made by the system.

Figure 5:
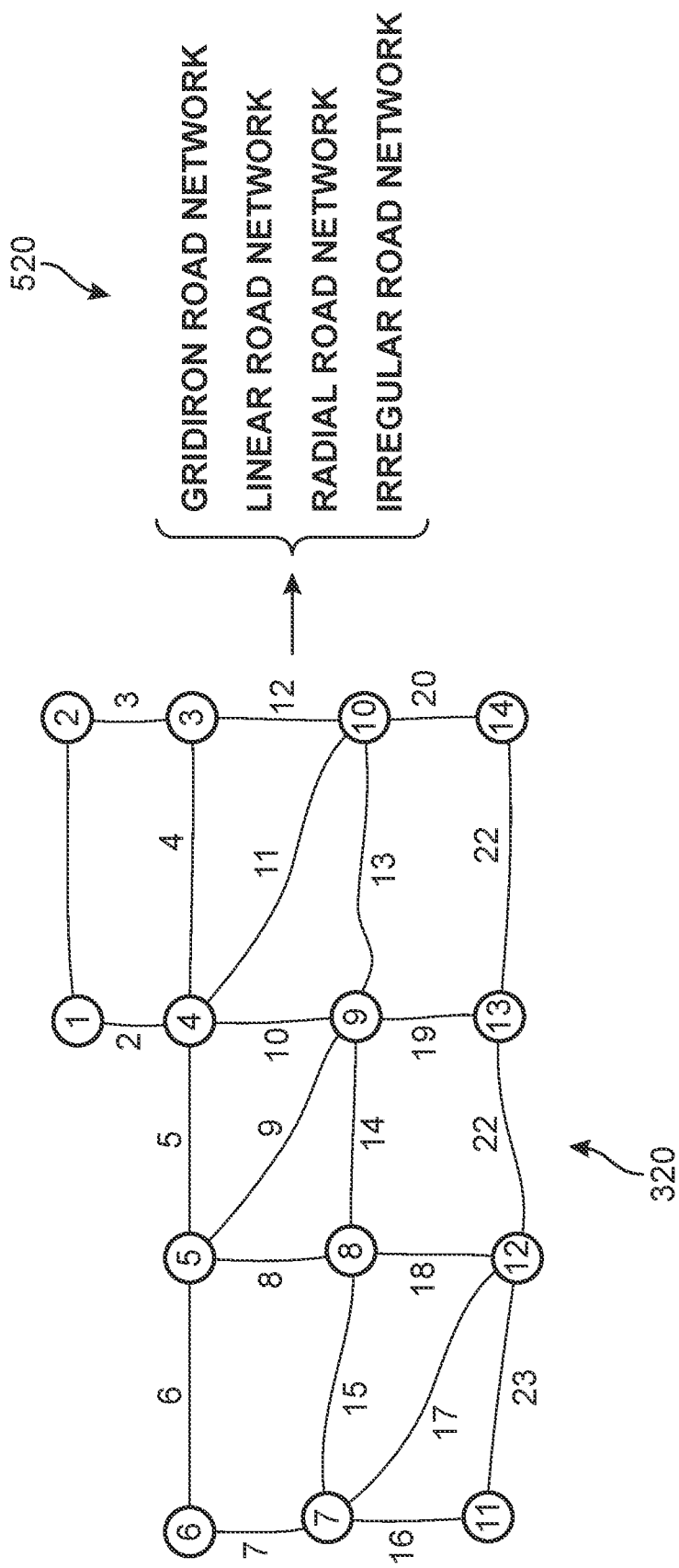
FIG. 5 is a schematic flow diagram of a process for classifying the graph as representing a specific network type, according to an embodiment.

In fourth step 240, an intelligent machine learning model is implemented to identify the pattern's network type from among pre-designated classifications. In other words, the intelligent machine learning model processes the graph information from the third step 230 and then identifies the network type that most closely matches the layout depicted by the graph. This is more clearly depicted in FIG. 5, where the first road pattern 320 is shown as it is processed by the machine learning model as it determines which of road network types 520 (e.g., gridiron road network, linear road network, radial road network, irregular road network, etc.) is most likely to apply to the target area's road layout. For purposes of this example, the first road pattern 320 is determined to fall under the gridiron road pattern classification.

Returning to FIG. 2, in a fifth step 250, the system performs a multi-node centrality assessment that will identify what is most likely to represent the "central" node in the graph. In different embodiments, a multi-node centrality processor can analyze the graph network and calculate plurality of node centrality measures for all the edges. In some embodiments, a machine learning model trained for determining node centrality may be applied to do so. In general, selection of an analytic technique (whether or not involving machine learning) may be based at least in part on attributes of a generated graph. For example, the generated graph (first road pattern 320 shown in FIG. 3) may have particular attributes (e.g., shape characteristics) that are better suited for analysis by a particular analytic technique. Example analytic techniques that may be used for analyzing data structures may include Betweenness Centrality, Katz Centrality, Eigenvector Centrality, Degree Centrality, Closeness Centrality, Triangle Counting, Percolation Centrality, Cross-Clique Centrality, and other suitable techniques. For example, with respect to the first road pattern 320, the multi-node centrality processor can apply one or more analytic techniques including degree centrality, closeness centrality, eigenvector centrality, efficiency or straightness centrality, betweenness centrality, and other available or custom centrality measures.

In some implementations, the multi-node centrality processor may be configured to include a mapping between graph attributes and analytic techniques, and a suitable analytic technique may be automatically selected using the mapping. For example, the multi-node centrality processor can analyze the generated graph, identify various graph attributes, and select an analytic technique that is mapped to (e.g., has a best fit with) the graph attributes.

As a general matter, the eigenvector centrality measure represents the influence of the node in the graph. The eigenvector centrality measure for a node can based on the concept that high-scoring nodes contribute more to the score of the node in question than equal connections to low-scoring nodes. Thus, the eigenvector centrality measure for a given node can take into account the value parameter of each node to which the given node is connected. Another centrality measure is a Katz centrality measure. The Katz centrality measure is similar to the eigenvector centrality measure but assigns lower values for connections to faraway nodes (e.g., nodes that are at least a threshold number of hops through other nodes away from the subject node). Thus, the Katz centrality measure for a given node can be based on, for each node to which the given node is connected, a combination of the value parameter for the node and the number of nodes between the given node and the node. The Katz centrality measure can be used with the eigenvector centrality measure or as an alternative to the eigenvector centrality measure when distant connections matter less (e.g., in a social network example).

Another centrality measure is a betweenness centrality measure. A betweenness centrality analytic technique, for example, may be mapped to graphs that represent individual connections with highly scored projects. In some implementations, algorithm selection may be automated by selecting an analytic method that minimizes deviation between the ideal state and an actual state of the network. A deviation score can be calculated, for example, based on minimizing a loss function (e.g., a sum of squares deviation or another suitable function) of expected vs. actual values. The betweenness measure for a node is based on the number of times the node acts as a bridge along a shortest path between two other nodes. In general, the betweenness centrality measure (as other centrality measures) does not consider specific targets.

In different embodiments, performing a centrality assessment includes determining a number of edges that are outgoing from the node that corresponds to the asset and determining the centrality of the asset based on the number of edges that are outgoing from the node that corresponds to the asset. In certain aspects, determining a centrality of the asset includes determining a number of unique edges that are outgoing from the node that corresponds to the asset and determining the centrality of the asset based on the number of unique edges that are outgoing from the node that corresponds to the asset. In some aspects, determining a centrality of the asset includes providing a prompt for a user to indicate a type of asset and determining the centrality of the asset based on the type of asset indicated by the user through the prompt.

As an illustration of these techniques, an algorithm for degree centrality is presented as Equation (1) below:

$$CD_i = \Sigma a_{ij}/(N-1) \quad \text{Equation (1)}$$

Where:
$CD_i$=Degree centrality of node i
$a_{ij}$=transfer-free link between nodes i and j, with j∈N and i≠j
N=all nodes in the network In this example, degree centrality is defined as the number of links incident upon a node (i.e., the number of ties that a node has). Thus, in one embodiment, the degree centrality of a vertex, for a given graph G=(V,E) with V vertices and E edges, can be understood to be defined by Equation (1).

In some cases where interactions between two nonadjacent nodes might depend on intermediate nodes that can have a strategic control or influence on them, a betweenness centrality algorithm may be used. Equation (2) presents this measure as the average proportion of paths between any two nodes within the network that traverse the node in question, out of the total number of possible paths between these two nodes. This index is critical in particular for public transport networks, as it can capture the relative importance of transfer nodes within the system, and assist in evaluating and modeling route and interchange capacity. In some cases, interactions between two nonadjacent nodes might depend on intermediate nodes that can have a strategic control or influence on them. This concept can be simply quantified by assuming that communication travels along only geodesics.

$$C_i^B = \frac{1}{(N-1)(N-2)} \sum_{j,k \in N; j \neq k; j,k \neq i} \frac{n_{jk}(i)}{n_{jkl}} \quad \text{Equation (2)}$$

Where:
i is the number of geodesics linking the two nodes j and k
$n_{jk}$ is the number of geodesic slinking the two nodes j and k that contain node i,
l is the node for which the betweenness centrality is being calculated.

Other algorithms for betweenness centrality can also be used such as that of Equation (3) below:

$$CB_k = \Sigma P_{ij}(k)/(N-1)(N-2) \quad \text{Equation (3)}$$

Where:
$CB_k$=Betweenness centrality for route segment k
$P_{ij}$ (k)=paths between nodes i and j that pass through segment k,
For all i j∈N and i≠j
N=all nodes in the network Following the centrality assessment for all of the different nodes in fifth step 250, the system is configured to perform a link utility index assessment in a sixth step 260. In some embodiments, a machine learning model trained for assessing link utility index may be applied to perform the assessment. In one embodiment, this step comprises an initialization of the number of new EV locations to be considered for the urban area under consideration (i.e., how many new EV charging stations are to be added). For example, the system can be configured to calculate the shortest path between every possible node combination and store this output in an Edge List. In addition, the system can then calculate the link occurrence for all of the individual possible EV locations from the shortest path edge list. As an example, if a simple graph G is a pair G=(V, E) where V is a finite set, called the vertices of G, and E is a subset of P2(V) (i.e., a set E of two-element subsets of V), called the edges of G, and where an edge set S={All shortest path edge set for every pair combination}, then a link usage index (LUI) for $r^{th}$ probable location LUI(r) can be expressed as LUI(r)=S(r).

Figure 6:
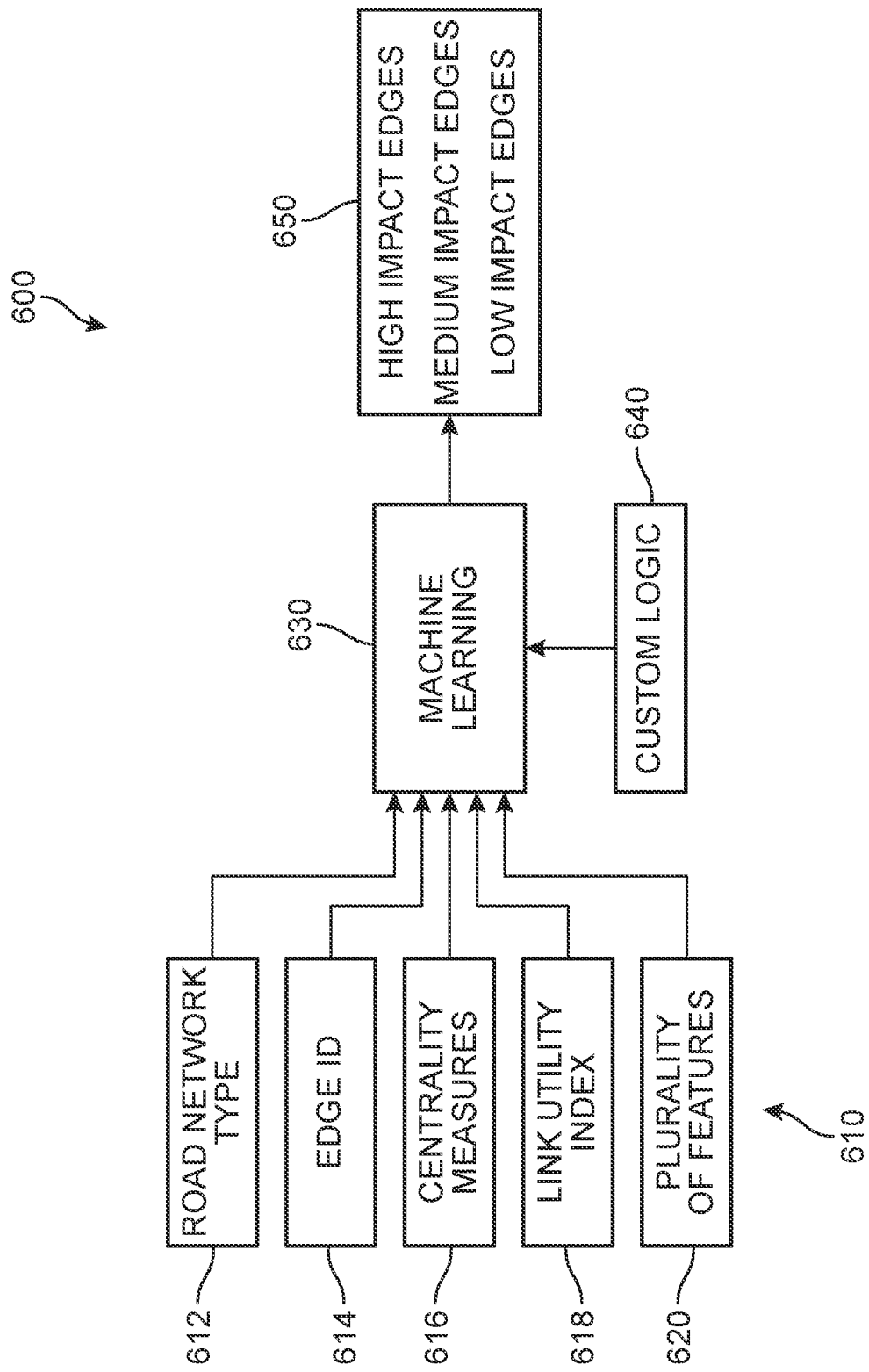
FIGS. 6 and 7 are diagrams showing a process for and output of edge categorization, according to an embodiment.

At a seventh step 270, the system performs an intelligent machine learning edge categorization process. For example, a machine learning model trained for categorizing edges may be applied to do so. Further details regarding the process performed during seventh step 270 are depicted in an edge categorization flow diagram 600 of FIG. 6. In FIG. 6, it can be seen that multiple features and data 610 generated during preceding steps, including road network type 612, edge ID 614, centrality measures 616, link utility index 618, and other features 620 are provided to a machine learning model 630, which can also optionally implement custom logic 640. For example, in some embodiments, each of road network type 612, edge ID 614, centrality measures 616, link utility index 618, and other features 620 may be determined by individual machine learning models corresponding to each feature and the results of these individual machine learning models could be input into machine learning model 630. In another example, in some embodiments, each of road network type 612, edge ID 614, centrality measures 616, link utility index 618, and other features 620 may be paired together in various combinations and input into multiple machine learning models corresponding to the pairs of features and the results of these machine learning models could be input into machine learning model 630. Machine learning model 630 can be trained to identify edges as well as categorize each edge as an edge type (e.g., as defined by edge ID 614). In this example, edges can be classified as high impact edges, medium impact edges, and low impact edges based on the relationships between each of the edges and/or how a particular edge is playing a role in the overall network. In one example, the system can analyze the position of each node and the position of the edges with respect to one another. In other examples, other categorization labels may be defined and included for greater discrimination.

Figure 7:
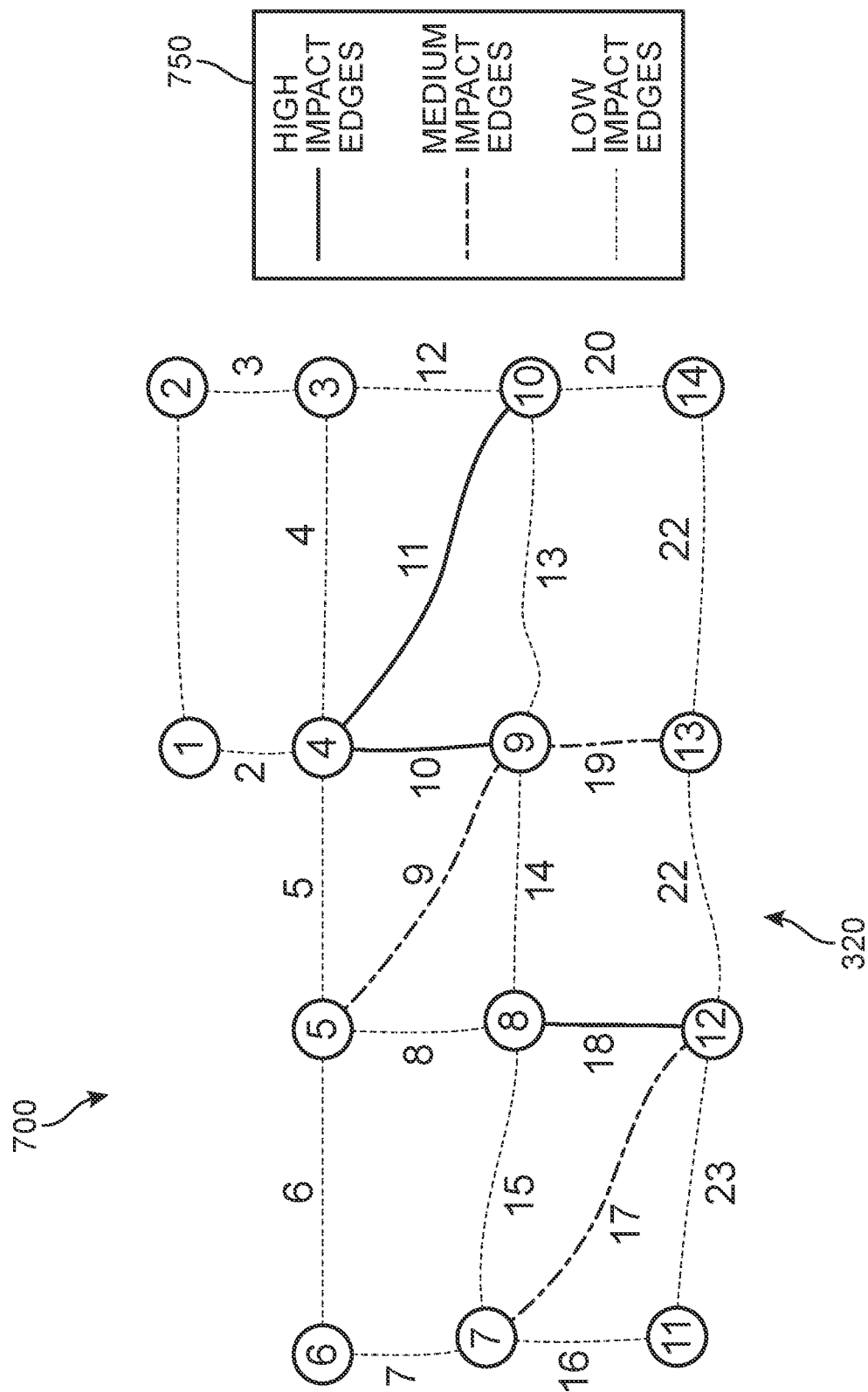

FIG. 7 illustrates an example of an output 700 of the intelligent machine learning edge categorization process with respect to first road pattern 320. In this case, it can be seen that three edges have been classified or categorized as medium impact edges (i.e., edges 9, 17, and 19), three edges have been categorized as high impact edges (i.e., edges 10, 11, and 18) with no edges being classified as low impact edges.

Following this categorization step, the system can identify a set (denoted by P, consisting of n number of elements) of possible alternatives for new EV locations, from which a 'best' subset (denoted by Q, consisting of a number of elements r and Q⊆P) will be chosen. In this example, the high impact edges (i.e, edges 10, 11, 18) can be identified as corresponding to locations for inclusion in this subset. This step can be understood to comprise initialization of the number of new EV Locations to be considered ("r") for the urban area under consideration. In this case, there are three edges that have been identified, and so r=3.

Returning to FIG. 2, at an eighth step 280, graph entropy can be calculated based on the output of the previous step. Initially, a centrality index for each individual node can be calculated by considering all of the possible EV locations. The Graph Entropy based on the individual node centrality value can then be calculated. Entropy can be understood to refer to information coding theory concepts used to explain the probability distributions. More specifically, where P is the probability distribution on the node set of V(G), and $p_i \in [0,1]$, the entropy of the graph G can be expressed by Equation (4) below:

$$H(G, P) = \sum_{i=1}^{N} p_i \log_2 (p_i) \quad \text{Equation (4)}$$

Figure 8:
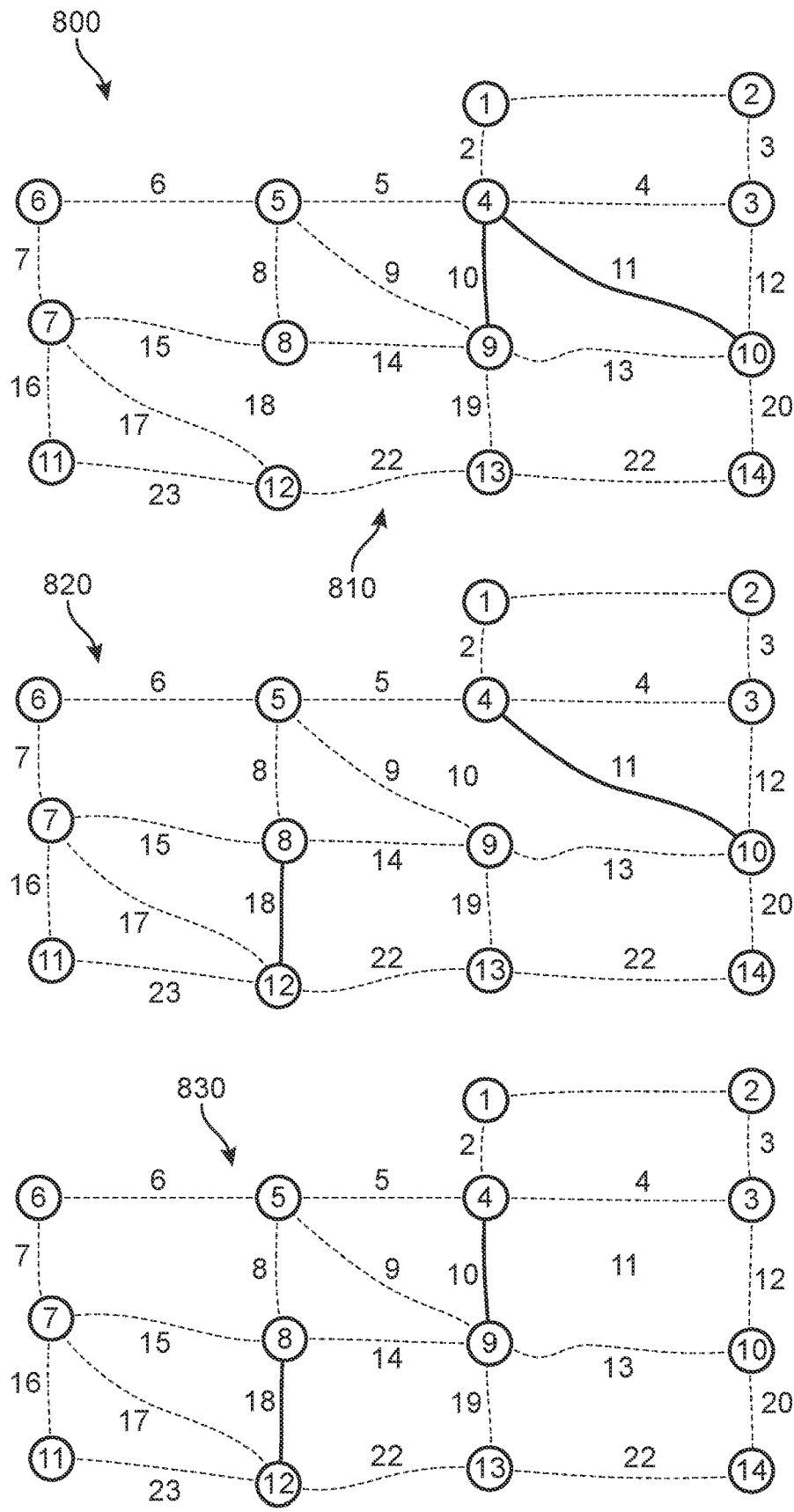
FIG. 8 depicts a sequence of graphs presenting graph entropy reduction factor calculation examples, according to an embodiment.

In a ninth step 290, a graph entropy reduction factor is calculated. The graph entropy reduction factor is calculated by a repeated series where, for each of the edges in the subset (e.g., edges 10, 11, and 18), one edge, representing one possible EV location, will be removed and the graph entropy (see eighth step 280 of FIG. 2) is recalculated. An example of this process is depicted with reference to a graph sequence 800 of FIG. 8. In a first graph 810, the first edge removed is edge 18, and a first graph entropy is calculated. In a second graph 820, the first edge is returned while the second edge (i.e., edge 10) is removed, and a second graph entropy is calculated. Finally, in a third graph 830, the second edge has been returned while the third edge (i.e., edge 11) is removed, and a third graph entropy is calculated. Thus, the number of times this calculation is repeated will be dependent on the number of edges included in the subset.

Thus, in some embodiments, calculating graph entropy for each node and the corresponding graph entropy reduction factor can be performed by applying a technique by which the system virtually removes one edge at a time to 'observe' and determine what the impact that edge is making to the network. The loss of the selected edge's will have an effect on the overall network, and this effect will be measured for each edge that is removed, to identify the edge whose loss would have the greatest impact on the network. This is done in lieu of analyzing the impact of every single edge in the network, which significantly reduces the computational processing burden for the system. In this example, three edges were (one by one) removed in order to better understand how the remaining edges would function or manage without that one edge. Based on the outcome of this analytic process, an edge selection can occur, in which identification of a set of possible alternatives for a new EV charging station location from which the best/optimal subset can be chosen. If a client says they need two—or three— locations, then the system will output the corresponding number of best two locations from the set of possibilities.

As noted earlier, the graph entropy can be calculated based on the individual node centrality value (for each node in the full network). The graph entropy will then be recalculated after each potential location (which can correspond to an edge, as the location can be anywhere along that edge) is removed from the network in an iterative or repeating process. For example, with respect to FIG. 8, the full network (no edges removed) might be associated with a graph entropy of 4. After removing the first edge depicted in the first graph 810, graph entropy might be calculated as 3.5, while removal of the second edge as depicted in the second graph 820 may result in a new graph entropy of 3.2, and finally removal of the third edge as depicted in the third graph 830 can result in a graph entropy of 3.9. Such a process allows the system to calculate the impact of each reduction. In one example, the edge removal leading to the greatest graph entropy can be strongly associated or correlated with the impact the edge has on the network.

Figure 9:
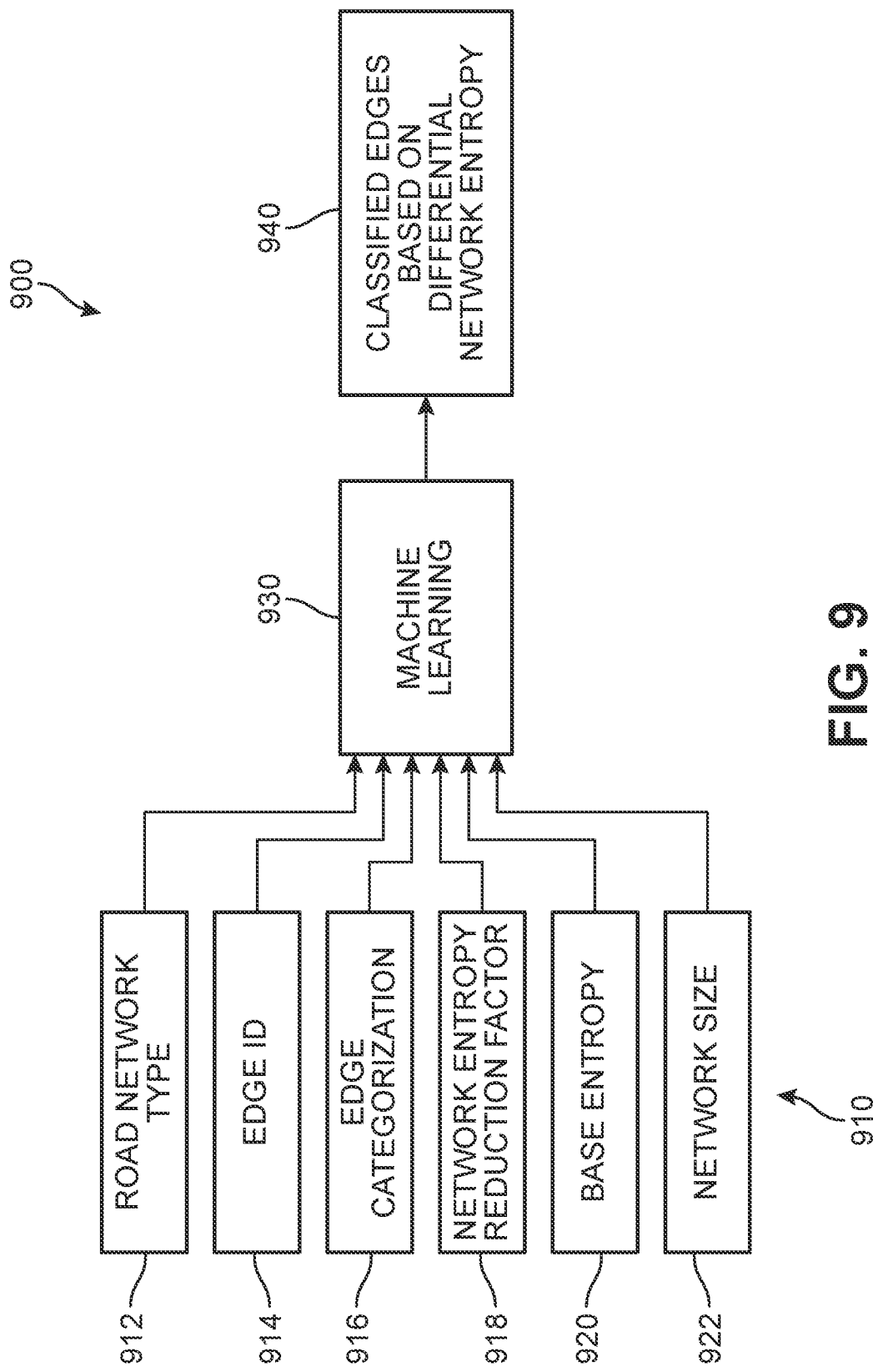
FIG. 9 is a schematic flow diagram showing a process for edge classification, according to an embodiment.

In a tenth step 292 shown in FIG. 2, final edge classification is performed. In this step, a machine learning model will categorize the edges by using the network entropy reduction factor as well as other features that were calculated during previous steps. An example of this process is depicted with reference to an edge classification flow diagram 900 in FIG. 9. Specifically, in FIG. 9, it can be seen that multiple features and data 910 generated during preceding steps, including road network type 912, edge ID 914, edge categorization 916, network entropy reduction factor 918, base entropy 920, and network size 922 are provided to a machine learning model 930. The machine learning model 930 is then able to classify edges based on differential network entropy using these features and data 910. In some embodiments, the disclosed method includes training machine learning model 930 to classify edges based on differential network entropy calculated using the first entropy reduction factor and the second entropy reduction factor. The differential network entropy calculated using the first entropy reduction factor and the second entropy reduction factor is the difference in value between the first entropy reduction factor and the second entropy reduction factor.

In different embodiments, the output of the machine learning model 930 can represent a type of ranking of the network based generally on the network entropy, which indicates what the impact of that edge has on the network. In different embodiments, network entropy can vary for different network patterns. Thus, the network type (e.g., grid, irregular, etc.) must also be considered as well as the categorization of each edge, the network entropy reduction factor, the base entropy, the network size (e.g., 10, 50, 100, 1000 edges, etc.) when determining the edge ranking.

In a final eleventh step 294 of FIG. 2, an analysis including a prescriptive recommendation can be presented. For example, such an output may be presented to an urban planning system which could be used during construction planning and/or by the government agency responsible for equitable development of EV infrastructure. The prescriptive recommendation may be based on the analysis of the impact each edge has on the network. For example, prescriptive recommendation may be based on the edge determined to have the highest impact on the network may be selected. In such an example, the road corresponding to the edge determined to have the highest impact may be recommended as the location for building the next EV charging station. In another example, prescriptive recommendation may be based on two or more top-ranked edges of the plurality of edges. In such an example, the roads corresponding to two or more top-ranked edges of the plurality of edges may be recommended as the location for building the next EV charging station. The method may further comprise building an EV charging station along the recommended road.

Furthermore, it should be appreciated that the proposed systems are sensitive to changes over time as additional charging stations are added. In other words, in some embodiments, the tool is suited to one-by-one incremental changes to the electric charging landscape that allows users to enter requests that are time-series inputs and generate incremental impacts and recommendations. The system can thus recalibrate the edge values between each time step. For example, with respect to the first road pattern, if a first analytics output in January identifies a first optimal site for a first charging station, a subsequent assessment (e.g., for a February infrastructure installation) can incorporate the effect of the inclusion of that first charging station having been built or installed at the first optimal site before determining a second optimal site for the second charging station. Similarly, if for March it is desired that two charging stations should be added, the system will be able to determine different third and fourth optimal sites that are selected in response to changes in the pattern due to the inclusion of the first charging station and the second charging station. If the third charging station and the fourth charging station are to be installed on different days during the month, there may be a first recommendation for the third charging station and then an updated second recommendation that takes into account the effect of the third charging station's recent installation. Finally, if for April, another, fifth charging station is expected to be added, the system will reassess the entire state of the network that takes into account the four new charging stations that were added over the course of the year so far. Thus, the values associated with each edge are dynamic, responsive to the installation of new charging locations, and the system is configured to update the values to allow for a recommendation that takes into account this dynamicity. In some embodiments, the system can intelligently process this data and iteratively calculate network values and change the network incrementally and then provide an output in a time series manner. In other words, rather than outputting one generalized recommendation or plan, the system generates an iterative simulated planning that is based on how each individual EV addition will impact the network and then how the upcoming next location will again impact the network.

Figure 10:
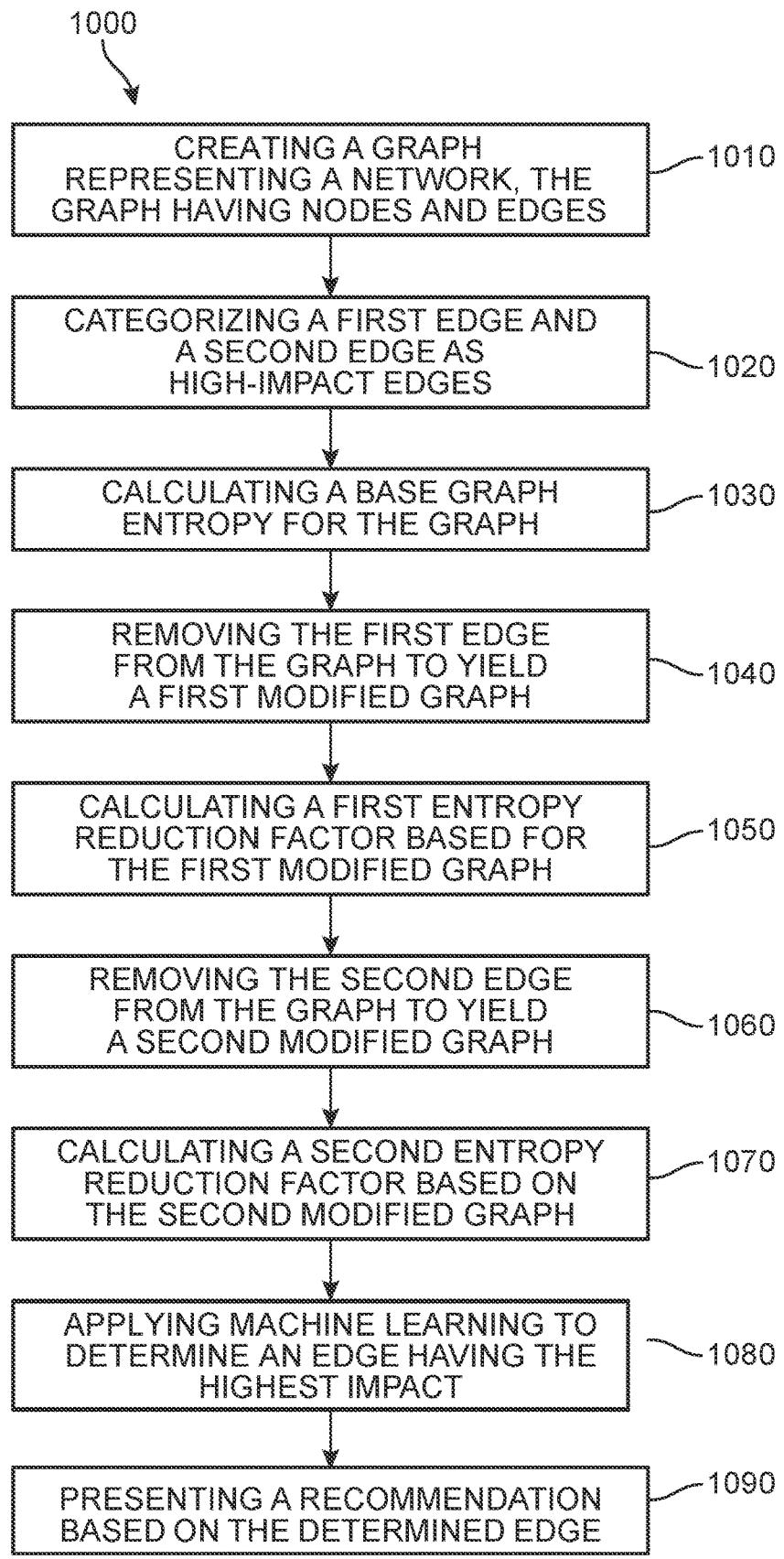
FIG. 10 is a flow chart depicting a method of identifying high impact network relationships, according to an embodiment.

FIG. 10 is a flow chart illustrating an embodiment of a method 1000 of identifying high impact relationships in a network. The method 1000 includes a first step 1010 of creating a graph representing the network, the graph comprising a plurality of nodes interconnected by a plurality of edges, each edge corresponding to a relationship between two nodes. A second step 1020 includes categorizing at least a first edge and a second edge of the plurality of edges as high impact edges based on a role the respective edge plays in the graph (while categorizing other edges in the plurality of edges in lower impact classes; in other words, not all of the edges can be categorized as high impact edges), for example via a first machine learning model, and a third step 1020 includes calculating a base graph entropy for the graph. The method 1000 also includes a fourth step 1040 of removing the first edge from the graph to yield a first modified graph, and a fifth step 1050 of calculating a first entropy reduction factor based on the first modified graph. A sixth step 1060 includes removing the second edge from the graph to yield a second modified graph, and a seventh step 1070 includes calculating a second entropy reduction factor based on the second modified graph. This process can be iteratively repeated for the number of edges that were categorized as being higher impact edges by the system. In addition, an eighth step 1080 includes applying a machine learning model to determine an edge of the plurality of edges having the highest impact on the network, wherein the determination is based on at least differential network entropy calculated using the first entropy reduction factor and the second entropy reduction factor, and a ninth step 1090 includes presenting, via a user interface, a recommendation based on the edge determined to have the highest impact on the network.

In other embodiments, the method may include additional steps or aspects. For example, the method can further include a step of performing a multi-node centrality assessment of the graph, where categorizing the first edge and second edge is additionally based on an output of the multi-node centrality assessment. In another example, the method includes a step of performing a link utility index assessment of the graph, where categorizing the first edge and second edge is additionally based on an output of the link utility index assessment.

In some embodiments, the (second) machine learning model is trained to rank each edge in order of its impact on the graph and select the top-ranked edge as the edge with the greatest impact (i.e., corresponding to the relationship that has the greatest impact on the network). In other words, applying a machine learning model to determine an edge of the plurality of edges having the highest impact on the network may include ranking each edge of the plurality of edges in order of impact on the network. In one example, the method also includes classifying the graph as a network type representing one of a gridiron network, a linear road network, a radial road network, and an irregular road network. In another example, the method also includes steps of receiving a user request for identifying a new location for an electric vehicle (EV) charging station in a target region, extracting data describing existing EV charging station locations in the target region, generating a map of a target area in which the existing EV charging station locations are indicated, and converting the map to the graph created to represent the network. Furthermore, in one embodiment, each edge can correspond to (represent) a roadway extending between two intersections in a roadway network. In some embodiments, the method comprises building an EV charging station along a roadway corresponding with the edge determined by a machine learning model to have the highest impact on the network.

In some embodiments, the machine learning models used to determine the seller's eligibility and/or buyer recommendations can include, but are not limited to, a Google™ API machine learning model, a Microsoft™ Azure API machine learning model, an IBM™ Bluemix API machine learning model, a classifier machine learning model, etc. In some embodiments, the system may perform a training operation on the machine learning model as discussed above. In some implementations, the system may train the machine learning model using, for example, an unsupervised training procedure and based on the training set. For example, the system may perform dimensionality reduction to reduce the data to a minimum feature set, thereby reducing resources (e.g., processing resources, memory resources, and/or the like) to train the machine learning model, and may apply a classification technique to the minimum feature set. Additionally, or alternatively, the system may use a support vector machine (SVM) classifier technique to generate a non-linear boundary between data points in the training set. In this case, the non-linear boundary is used to classify test data into a particular class.

Additionally, or alternatively, the system may train the machine learning model using a supervised training procedure that includes receiving input to the machine learning model from a subject matter expert or other operator, which may reduce an amount of time, an amount of processing resources, and/or the like to train the machine learning model of activity automatability relative to an unsupervised training procedure. In some embodiments, the system may use one or more other model training techniques, such as a neural network technique, a latent semantic indexing technique, and/or the like. For example, the system may perform an artificial neural network processing technique (e.g., using a two-layer feedforward neural network architecture, a three-layer feedforward neural network architecture, and/or the like) to perform pattern recognition with regard to patterns of whether a document includes a particular response type or input value. In this case, using the artificial neural network processing technique may improve an accuracy of the trained machine learning model generated by the system by being more robust to noisy, imprecise, or incomplete data, and by enabling the electronic document system to detect patterns and/or trends undetectable to human analysts or systems using less complex techniques. In some embodiments, the machine learning model may include a support vector machine model, a linear regression model, a logistic regression model, a naive Bayes model, a linear discriminant analysis model, a decision tree model, a k-nearest neighbor model, a neural network model, and/or the like.

Figure 11:
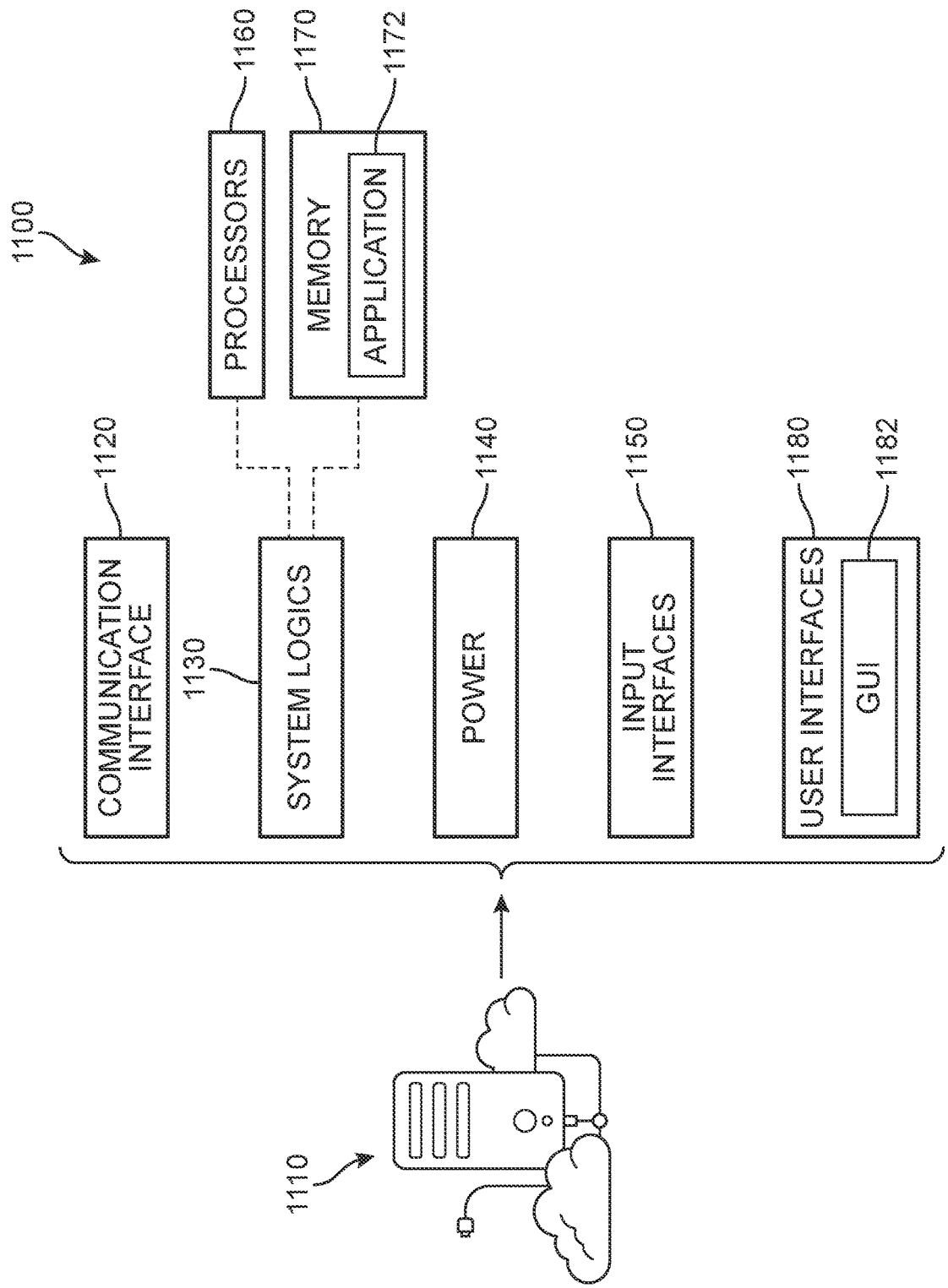
FIG. 11 is a diagram representing an architecture for implementing the proposed systems, according to an embodiment.

For purposes of context, an embodiment of a system architecture 1100 is illustrated in FIG. 11. In this example, a distribution network simulation system 1110 includes a communication interface 1120, system logics 1130, power 1140, input interfaces 1150, and user interfaces 1180 (which can further include graphical user interface 1182). System logics 1130 can include processors 1160 and memory 1170 on which application 1172 may reside.

It should be understood that the systems and/or methods as described herein may be implemented using different computing systems, components, modules, and connections. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service system. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage devices, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

Embodiments may also include one or more computers and one or more storage devices storing instructions that are operable, when executed by the one or more computers, to cause the one or more computers to perform the disclosed methods.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system that supports execution of a complete operating system ("OS"). A process virtual machine may execute a single program and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating system to the guest operating systems and may manage the execution of the guest operating systems. Multiple instances of a variety of operating systems may share virtualized hardware resources.

A computer-based network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A non-transitory computer-readable medium comprising:
storing software comprising instructions executable by one or more computers which, upon such execution, cause the one or more computers to:
create a graph representing an electric vehicle (EV) charging network, the graph comprising a plurality of nodes interconnected by a plurality of edges, each edge of the plurality of edges corresponding to a relationship between two nodes;
categorize at least a first edge and a second edge of the plurality of edges as high impact edges;
perform a centrality assessment of the graph, wherein categorizing the first edge and the second edge is additionally based on an output of the centrality assessment, and
wherein performing the centrality assessment includes determining a number of edges that are outgoing from a node that corresponds to an asset and determining a centrality of the asset based on the number of edges that are outgoing from the node that corresponds to the asset, wherein the asset includes content in an actuatable pop-up window, and wherein the performing the centrality assessment includes at least one of:
determining the centrality of the asset includes determining a number of unique edges that are outgoing from the node that corresponds to the asset and determining the centrality of the asset based on the number of unique edges that are outgoing from the node that corresponds to the asset;
determining the centrality of the asset includes providing a prompt for a user to indicate a type of asset and determining the centrality of the asset based on the type of asset indicated by the user through the prompt;
perform a link utility index assessment of the graph, wherein categorizing the first edge and the second edge is additionally based on an output of the link utility index assessment, wherein the performing the link utility index assessment comprising:
identifying a number of new EV locations to be considered for a region which is under construction,
calculating a shortest path between each node of the plurality of nodes and store the shortest path as output in an edge list, and
calculate a link occurrence for each new EV location from the shortest path stored in the edge list;
calculate a base graph entropy for the graph;
remove the first edge from the graph to yield a first modified graph;
calculate a first entropy reduction factor based on the first modified graph;
remove the second edge from the graph to yield a second modified graph;
calculate a second entropy reduction factor based on the second modified graph;
determine an impact of each of the first edge and the second edge of the plurality of edges on the electric vehicle (EV) charging network by virtually removing one edge at a time based on the first entropy reduction factor and the second entropy reduction factor;
train a machine learning model using differential network entropy calculated using the first entropy reduction factor and the second entropy reduction factor, wherein training the machine learning model comprises:
reduce data to a minimal feature set by performing dimensionality reduction using an unsupervised training procedure,
apply a classification technique to the minimum feature set, wherein the classification technique includes a support vector machine (SVM) classifier, and
train, using a supervised training procedure, the machine learning model relative to the unsupervised training procedure by receiving input to reduce an amount of time and an amount of processing resources;
apply the machine learning model based on differential network entropy calculated using the first entropy reduction factor and the second entropy reduction factor, to select the first edge as one edge of the plurality of edges in the graph associated with the highest impact includes ranking each edge of the plurality of edges in order of impact on the electric vehicle (EV) charging network based on a relationships between each of the edges and a role of the edge in the electric vehicle (EV) charging network, wherein applying the machine learning model comprises instructions to:
receive a user request for identifying a new location for an electric vehicle (EV) charging station in a target region;
extract, using an existing EV location extractor, existing EV charging station locations in the target region based on selected map area by the user and filtering data based on the selected map area;
generate a map of the target region from the selected map area in which the existing electric vehicle (EV) charging station locations are indicated, wherein the map generation evaluates the target region based on a network map analyzer;
convert the map to the graph created to represent the electric vehicle (EV) charging network; and
display, via a user interface with the one or more computers, a recommendation for the optimal location of the-a new electric vehicle (EV) charging station, in which a first relationship in the electric vehicle (EV) charging network that corresponds to the first edge is identified as having the highest impact on the electric vehicle (EV) charging network.

2. The non-transitory computer-readable medium storing software of claim 1, wherein the instructions further cause the one or more computers to classify the graph as a network type representing one of a gridiron network, a linear road network, a radial road network, and an irregular road network.

3. The non-transitory computer-readable medium storing software of claim 1, wherein each edge corresponds to a roadway extending between two intersections.

4. A system for identifying high impact relationships in an electric vehicle (EV) charging network, the system comprising:

one or more computers and one or more storage devices storing instructions that are operable, when executed by the one or more computers, to cause the one or more computers to:
create a graph representing the electric vehicle (EV) charging network, the graph comprising a plurality of nodes interconnected by a plurality of edges, each edge of the plurality of edges corresponding to a relationship between two nodes;
categorize at least a first edge and a second edge of the plurality of edges as high impact edges;
perform a multi-node centrality assessment of the graph, wherein categorizing the first edge and the second edge is additionally based on an output of the multi-node centrality assessment, and
wherein performing the centrality assessment includes determining a number of edges that are outgoing from a node that corresponds to an asset and determining a centrality of the asset based on the number of edges that are outgoing from the node that corresponds to the asset, wherein the asset includes content in an actuatable pop-up window, and wherein the performing the centrality assessment includes at least one of:
determining the centrality of the asset includes determining a number of unique edges that are outgoing from the node that corresponds to the asset and determining the centrality of the asset based on the number of unique edges that are outgoing from the node that corresponds to the asset;
determining the centrality of the asset includes providing a prompt for a user to indicate a type of asset and determining the centrality of the asset based on the type of asset indicated by the user through the prompt
perform a link utility index assessment of the graph, wherein categorizing the first edge and the second edge is additionally based on an output of the link utility index assessment, wherein the performing the link utility index assessment comprising:
identifying a number of new EV locations to be considered for a region which is under construction,
calculating a shortest path between each node of the plurality of nodes and store the shortest path as output in an edge list, and
calculate a link occurrence for each new EV location from the shortest path stored in the edge list;
calculate a base graph entropy for the graph;
remove the first edge from the graph to yield a first modified graph;
calculate a first entropy reduction factor based on the first modified graph;
remove the second edge from the graph to yield a second modified graph;
calculate a second entropy reduction factor based on the second modified graph;
determine an impact of each of the first edge and the second edge of the plurality of edges on the electric vehicle (EV) charging network by virtually removing one edge at a time based on the first entropy reduction factor and the second entropy reduction factor;
train a machine learning model using differential network entropy calculated using the first entropy reduction factor and the second entropy reduction factor, wherein training the machine learning model comprises:
reduce data to a minimal feature set by performing dimensionality reduction using an unsupervised training procedure,
apply a classification technique to the minimum feature set, wherein the classification technique includes a support vector machine (SVM) classifier, and
train, using a supervised training procedure, the machine learning model relative to the unsupervised training procedure by receiving input to reduce an amount of time and an amount of processing resources;
apply the machine learning model based on differential network entropy calculated using the first entropy reduction factor and the second entropy reduction factor, to select the first edge as one edge of the plurality of edges in the graph associated with the highest impact includes ranking each edge of the plurality of edges in order of impact on the electric vehicle (EV) charging network based on a relationships between each of the edges and a role of the edge in the electric vehicle (EV) charging network, wherein applying the machine learning model comprises instructions to:
receive a user request for identifying a new location for an electric vehicle (EV) charging station in a target region;
extract, using an existing EV location extractor, existing EV charging station locations in the target region based on selected map area by the user and filtering data based on the selected map area;
generate a map of the target region from the selected map area in which the existing electric vehicle (EV) charging station locations are indicated, wherein the map generation evaluates the target region based on a network map analyzer;
convert the map to the graph created to represent the electric vehicle (EV) charging network; and
display, via a user interface with the one or more computers, a recommendation for the optimal location of the-a new electric vehicle (EV) charging station, in which a first relationship in the electric vehicle (EV) charging network that corresponds to the first edge is identified as having the highest impact on the electric vehicle (EV) charging network.

5. The system of claim 4, wherein the instructions further cause the one or more computers to:
perform a multi-node centrality assessment of the graph; and
wherein categorizing the first edge and the second edge is additionally based on an output of the multi-node centrality assessment.

6. The system of claim 4, wherein the instructions further cause the one or more computers to:
perform a link utility index assessment of the graph; and
wherein categorizing the first edge and the second edge is additionally based on an output of the link utility index assessment.

7. The system of claim 4 wherein each edge corresponds to a roadway extending between two intersections.

* * * * *